(12) United States Patent
Miura

(10) Patent No.: US 8,553,127 B2
(45) Date of Patent: *Oct. 8, 2013

(54) VIDEO APPARATUS AND IMAGE SENSING APPARATUS

(75) Inventor: Hiroya Miura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 57 days.
This patent is subject to a terminal disclaimer.

(21) Appl. No.: 12/814,521

(22) Filed: Jun. 14, 2010

(65) Prior Publication Data

US 2010/0277645 A1    Nov. 4, 2010

Related U.S. Application Data

(63) Continuation of application No. 11/116,221, filed on Apr. 28, 2005, now Pat. No. 7,768,564.

(30) Foreign Application Priority Data

May 14, 2004  (JP) .................................. 2004-145487

(51) Int. Cl.
*H04N 5/222* (2006.01)

(52) U.S. Cl.
USPC .................................................... 348/333.01

(58) Field of Classification Search
USPC .. 348/356–359, 333.01–333.13; 725/86–104
See application file for complete search history.

(56) References Cited

U.S. PATENT DOCUMENTS 5,477,262 A * 12/1995 Banker et al. ............... 725/38
6,144,412 A * 11/2000 Hirano et al. ............. 348/441
6,256,068 B1   7/2001 Takada et al.
6,421,094 B1 *  7/2002 Han ............................ 348/569

(Continued)

FOREIGN PATENT DOCUMENTS

CN    1194077 A    9/1998
JP    2001-016521 A    1/2001

(Continued)

OTHER PUBLICATIONS

Jul. 3, 2009 Japanese Official Action in Japanese Patent Appln. No. 2004-145487 (with translation).

(Continued)

*Primary Examiner* — Roberto Velez
*Assistant Examiner* — Tuan Le
(74) *Attorney, Agent, or Firm* — Fitzpatrick, Cella, Harper & Scinto

(57) ABSTRACT

This invention can reduce the circuit scale by synthesizing OSD data to be superposed on a picture of each resolution by using common OSD data. According to this invention, a video resolution converter converts an HD (High Definition) video signal into an SD (Standard Definition) video signal such as an NTSC or PAL video signal. A memory controller receives a sync signal identical to an SD picture obtained by frequency-dividing an HD video signal, and a sync signal based on an SD video signal, and reads out OSD data (4 bits per pixel) from the memory on the basis of these sync signals. The OSD data read out on the basis of the SD video signal is synthesized with the SD video signal by an SD_OSD_MIX unit, and then output. The OSD data read out on the basis of the SD sync signal synchronized with the HD is multiplied by an integer by an OSD resolution converter, synthesized with an HD video signal by an HD_OSD_MIX unit, and then output.

15 Claims, 6 Drawing Sheets

(56) References Cited

U.S. PATENT DOCUMENTS

| | | |
|---|---|---|
| 6,570,626 B1 | 5/2003 | Mendenhall et al. |
| 6,664,970 B1 | 12/2003 | Matsushita |
| 7,079,193 B2 * | 7/2006 | Choi .......................... 348/564 |
| 7,158,713 B2 | 1/2007 | Goto et al. |
| 7,768,564 B2 * | 8/2010 | Miura ...................... 348/333.01 |
| 2002/0025083 A1 * | 2/2002 | Asano ........................ 382/298 |
| 2002/0036710 A1 | 3/2002 | Choi |
| 2002/0047851 A1 | 4/2002 | Hirase et al. |
| 2002/0051154 A1 * | 5/2002 | Aneja et al. ................... 358/1.9 |
| 2002/0093518 A1 | 7/2002 | Nakano |
| 2004/0085480 A1 * | 5/2004 | Salzer et al. ................. 348/584 |
| 2006/0056716 A1 | 3/2006 | Komeno |

FOREIGN PATENT DOCUMENTS

| | | |
|---|---|---|
| JP | 2002-125193 A | 4/2002 |
| WO | 97/08890 A1 | 3/1997 |
| WO | 2004/091198 A1 | 10/2004 |

OTHER PUBLICATIONS

Jan. 8, 2010 Chinese Official Action in Chinese Patent Appln. No. 200510069365 (with translation).

* cited by examiner

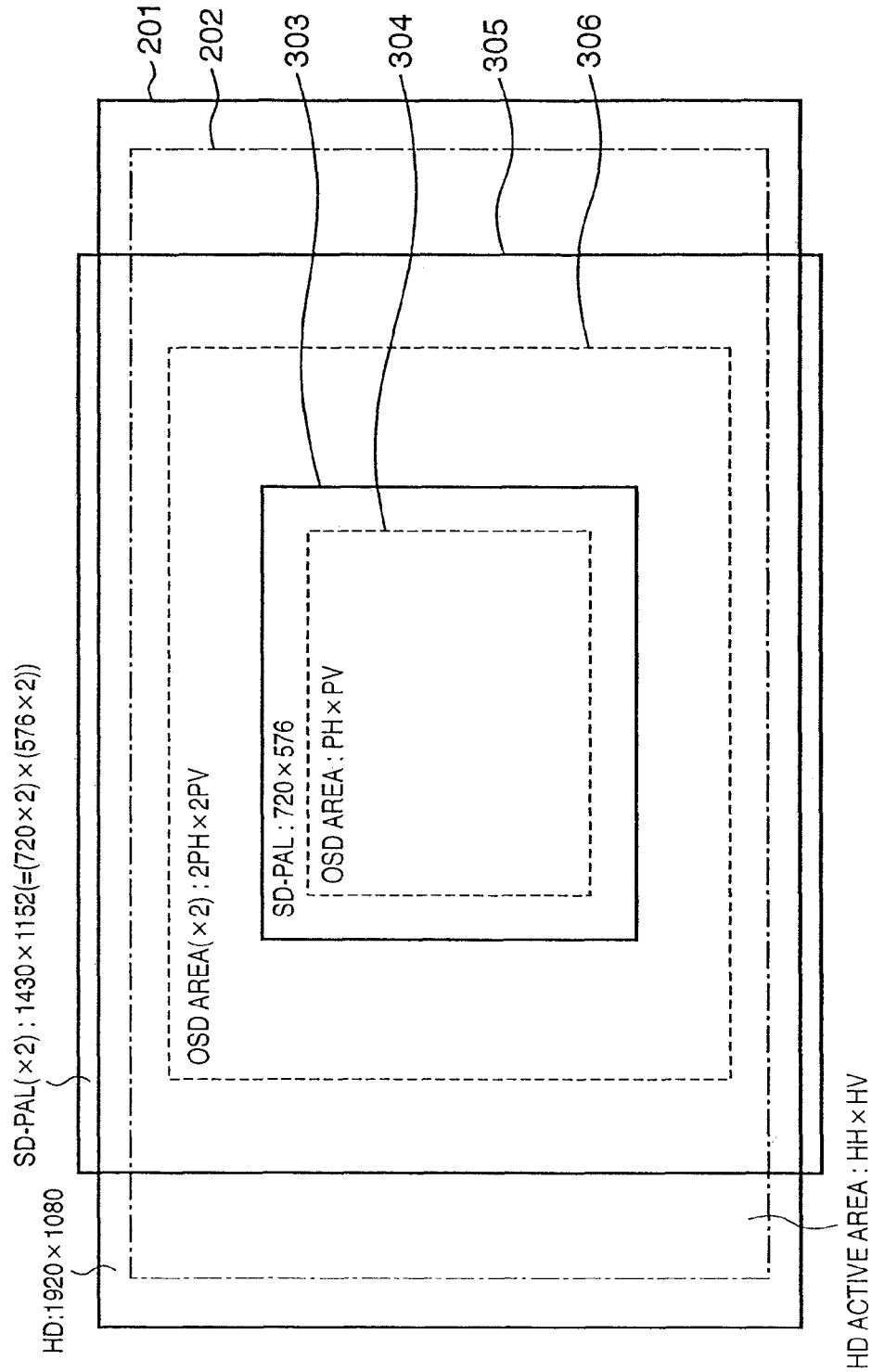

VIDEO APPARATUS AND IMAGE SENSING APPARATUS

This application is a continuation of application Ser. No. 11/116,221 filed Apr. 28, 2005.

FIELD OF THE INVENTION

The present invention relates to a technique of multiplexing an OSD (On Screen Display) on a picture when a picture is displayed on a plurality of display devices having different display resolutions.

BACKGROUND OF THE INVENTION

A video apparatus such as a digital video camera conventionally has a plurality of display destinations, for example, as components of the main body, a liquid crystal display panel, an EVF (Electrical View Finder), and a line-out (e.g., an S output for transmitting a composite video output, or brightness and color difference signals independently) for output to an external display (e.g., a TV monitor). Video signals to be displayed on or output to these display destinations generally have the same resolution. The video apparatus has, e.g., a function of switching whether to or not to multiplex the same OSD on respective display destinations.

In terms of the video format environment, a higher-resolution Hi-Vision format (to be referred to as an HD format hereinafter) coexists with conventional NTSC and PAL formats (to be referred to as SD formats hereinafter). Various corresponding digital formats are defined by groups such as ITU (International Telecommunication Union) and SMPTE (Society of Motion Picture and Television Engineers).

These days, consumer digital video cameras capable of recording and playback in both the SD and HD formats are available. Some digital video cameras can output a picture of the HD format to a display device capable of receiving and displaying the HD format in display, for example, in playback in the HD format, and can also down-convert the resolution of a picture from the HD format to the SD format within the apparatus and output the picture of the SD format to a display device capable of receiving and displaying the SD format (e.g., Japanese Patent Laid-Open No. 2002-125193).

Under the circumstance, when different video formats are to be displayed and output, dedicated OSD data are multiplexed on the respective video formats and displayed. Alternatively, after OSD data is multiplexed on an original picture, their resolutions are changed to display the OSD and picture. OSD data to be displayed must be prepared for each resolution, and the quality of OSD data may be degraded.

SUMMARY OF THE INVENTION

It is an object of the present invention to provide a technique of multiplexing one common OSD data on video formats of different resolutions by a simple mechanism without degrading the OSD quality.

To solve the above problem, for example, a video apparatus according to the present invention has the following arrangement.

That is, a video apparatus which generates video signals having a plurality of resolutions comprises a memory which stores bitmap OSD (On Screen Display) data for a predetermined reference resolution, video signal resolution conversion means for generating, from an original video signal, video signals having different resolutions including the reference resolution, read means for reading out OSD data for each video signal by accessing the memory in synchronism with the video signals having the plurality of resolutions, OSD data resolution conversion means for converting OSD data read out for a video signal having a resolution other than the reference resolution into OSD data having the resolution, synthesis means, arranged for each resolution, for synthesizing a video signal having each resolution and corresponding OSD data, and output means for outputting the video signal synthesized by the synthesis means.

According to a preferred aspect, the resolution of OSD data is preferably so converted as to multiply the resolution by M or 1/M (M is an integer) in the horizontal direction and by N or 1/N (N is an integer) in the vertical direction.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 6 is a view showing the relationship between an HD display frame, PAL display frame, and OSD data area according to the embodiment.

DETAILED DESCRIPTION OF THE PREFERRED EMBODIMENT

A preferred embodiment of the present invention will be described in detail below with reference to the accompanying drawings.

<Description of Apparatus Arrangement>

Figure 1:
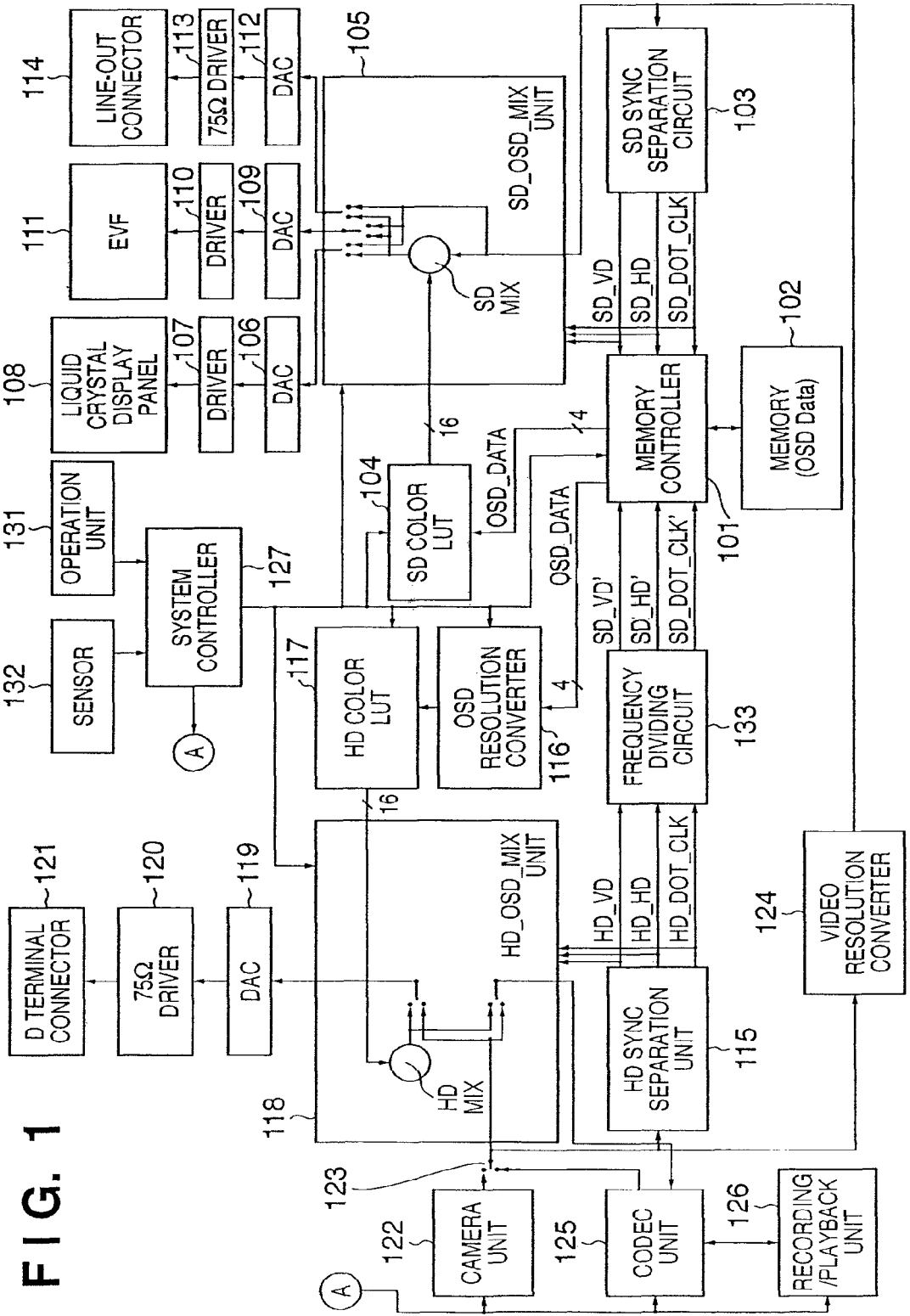
FIG. 1 is a block diagram showing the OSD-associated arrangement of a digital video camera according to an embodiment.

FIG. 1 is a block diagram showing a video apparatus according to the embodiment. The arrangement of a digital video camera will be exemplified as the video apparatus. The image sensing resolution of the camera unit (CCD) is a resolution of 1,920×1,080 pixels in the maximum effective display area for HD (High Definition). The video apparatus has a function of down-converting this resolution by a video resolution converter 124 to a resolution of 720×480 or 720× 576 in the maximum effective display area for the SD format (Standard Definition=NTSC or PAL format).

In FIG. 1, reference numeral 127 denotes a system controller which controls the overall video apparatus and is formed from a microcomputer.

Reference numeral 101 denotes a memory controller which reads out, from a memory 102, OSD data to be multiplexed on an SD picture down-converted by the video resolution converter 124 in synchronism with a sync signal from an SD sync separation circuit 103. Similarly, the memory controller 101 reads out, from the memory 102, OSD data to be multiplexed on an HD picture selected by a video selector 123 from a camera unit 122 or CODEC unit 125 in synchronism with an HD sync signal input via a frequency dividing circuit 133.

The memory 102 includes a ROM and RAM which store data, a program for implementing various control means, and bitmap OSD data to be finally multiplexed on an HD picture selected by the video selector 123 from the camera unit 122 or CODEC unit 125 in the embodiment, and are also used as a work area in order to execute control, as needed.

The SD sync separation circuit 103 separates a vertical sync signal (VD) and horizontal sync signal (HD) from an SD picture down-converted from an HD picture by the video resolution converter 124, generates a dot clock (SD_DOT_CLK) synchronized with a display pixel, and sends these signals to the memory controller 101 and an SD_OSD_MIX unit 105. At this stage, the HD and SD video signals are asynchronous.

Reference numeral 104 denotes a 4-bit-input/16-bit-output SD color LUT (Look Up Table) which is formed from a RAM in order to change (write) storage data by the system controller 127. An address expressed by a 4-bit input is made up of 0 to 15, each address stores 16-bit data, and thus the capacity of the SD color LUT 104 is 16×16=256 bits=32 bytes. Output 16 bits are assigned the values of a brightness Y and color differences Cr and Cb and how to multiplex an OSD on a picture (transparent, overwrite, simple addition, arithmetic mean, blink possible/impossible, or the like) (details of which will be described later).

In synchronism with a sync signal separated by the SD sync separation circuit 103, the SD_OSD_MIX unit 105 multiplexes, on an SD picture down-converted from an HD picture by the video resolution converter 124, an OSD which is based on the SD color LUT 104 and designated by OSD data (16 bits) read out from the memory 102.

Reference numeral 106 denotes a DAC (Digital Analog Converter) which converts a digital video signal into an analog video signal. Reference numeral 107 denotes a liquid crystal driver which displays on a liquid crystal display panel 108 an analog video signal converted by the DAC 106. The liquid crystal display panel 108 displays OSD (On Screen Display) information or the like controlled by the system controller 127 on the basis of a video signal sent from the camera unit 122 via the video selector 123, video resolution converter 124, SD_OSD_MIX unit 105, DAC 106, and driver 107, a playback video signal from a recording/playback unit 126 via the CODEC unit 125 and video selector 123, and input operation information from the user via an operation unit 131 and various sensors 132 of the apparatus.

Reference numeral 109 denotes a DAC (Digital Analog Converter) which is identical to the DAC 106. Reference numeral 110 denotes a liquid crystal driver which drives an EVF (Electrical View Finder) 111 to display a picture. The EVF 111 performs the same display as that of the liquid crystal display panel 108.

Reference numeral 112 denotes a DAC (Digital Analog Converter) which is identical to the DACs 106 and 109. Reference numeral 113 denotes a 75Ω driver which drives an externally connected TV monitor (not shown) or the like via a line-out connector and transmits a video signal. Reference numeral 114 denotes a line-out connector which outputs a video signal of the NTSC or PAL format as an S signal for Sending a composite signal, or brightness and color difference signals independently.

Reference numeral 115 denotes an HD sync separation unit which separates an HD picture selected by the video selector 123 from the camera unit 122 or CODEC unit 125 into a vertical sync signal (HD_VD) and horizontal sync signal (HD_HD), generates a dot clock (HD_DOT_CLK) synchronized with a display pixel, and sends these signals to the frequency dividing circuit 133 and an HD_OSD_MIX unit 118.

The frequency dividing circuit 133 outputs the input signals HD_VD, HD_HD, and HD_DOT_CLK as sync signals SD_VD', SD_HD', and SD_DOT_CLK' of the SD format to the memory controller 101.

Reference numeral 116 denotes an OSD resolution converter which arbitrarily multiplies, by an integer independently in the horizontal and vertical directions, OSD data read out from the memory 102 via the memory controller 101 under the control of the system controller 127. Since OSD data of the SD format is output from the memory 102, the data is multiplied by an integer in the horizontal and vertical directions to generate OSD data of the HD format.

Reference numeral 117 denotes a 4-bit-input/16-bit-output HD color LUT (Look Up Table), similar to the SD color LUT 104. The data contents of the HD color LUT 117 can be changed by the system controller 127. The meaning of each of 16 bits output from the HD color LUT 117 is the same as that of the SD color LUT 104, and the output 16 bits are assigned the values of the brightness Y and color differences Cr and Cb and how to multiplex an OSD on a picture (transparent, overwrite, simple addition, arithmetic mean, blink possible/impossible, or the like) (details of which will be described later).

The HD_OSD_MIX unit 118 multiplexes, on an HD picture selected by the video selector 123 from the camera unit 122 or CODEC unit 125, an OSD which is based on the HD color LUT 117 and designated by OSD data prepared by arbitrarily multiplexing OSD data read out from the memory 102 by the OSD resolution converter 116 independently in the horizontal and vertical directions in synchronism with a sync signal separated by the HD sync separation unit 115.

Reference numeral 119 denotes a DAC (Digital Analog Converter) having a high-speed conversion characteristic capable of DA conversion up to display of an HD resolution. Reference numeral 120 denotes a 75Ω driver which drives an external HD-compatible monitor (not shown) or the like connected to the D terminal and transmits a video signal. Reference numeral 121 denotes a D terminal connector which is based on "CP-4120: Interface Between a Digital Tuner and Television Receiver using D-Connector" established by JEITA (Japan Electronics and Information Technology Industries Association), and connects an external TV monitor (not shown) or the like by separately using a D terminal cable (not shown).

The camera unit 122 includes a lens, CCD (Charge Coupled Device), and other peripheral circuits and functions necessary for image sensing, and can take an HD picture.

The video selector 123 selects a video signal from the camera unit 122 or CODEC unit 125 under the control of the system controller 127.

The video resolution converter 124 has a function of down-converting an HD picture from the camera unit into an SD picture.

The CODEC unit 125 MPEG2-encodes an HD video signal on the basis of the MPEG2 (Moving Picture. Experts Group 2) format, and sends the encoded signal to the recording/playback unit 126 to record the data on a recording medium (not shown). In playback, recorded data is read out from a recording medium (not shown) by the recording/playback unit 126, and the CODEC unit MPEG2-decodes the data and sends it to the video selector 123.

The recording/playback unit 126 records video data encoded by the CODEC unit 125 on a recording medium (not shown) such as a magnetic tape, optical disk, or HDD. In playback, the recording/playback unit 126 reads out encoded video data from the recording medium, and transfers the data to the CODEC unit 125.

The system controller 127 controls the whole apparatus, and is connected to the operation unit 131 (instruction switches such as a recording button, playback button, and fast-forward button) to be operated by the user, and various sensors 132 (remaining battery amount sensor, recording medium presence/absence sensor, timer, and the like). The system controller 127 switches between photographing and playback, and in addition, writes in the memory 102 via the memory controller 101 OSD data (one pixel=4 bits) to be properly superposed and displayed on a photographed picture.

<Memory Controller 101>

Figure 2:
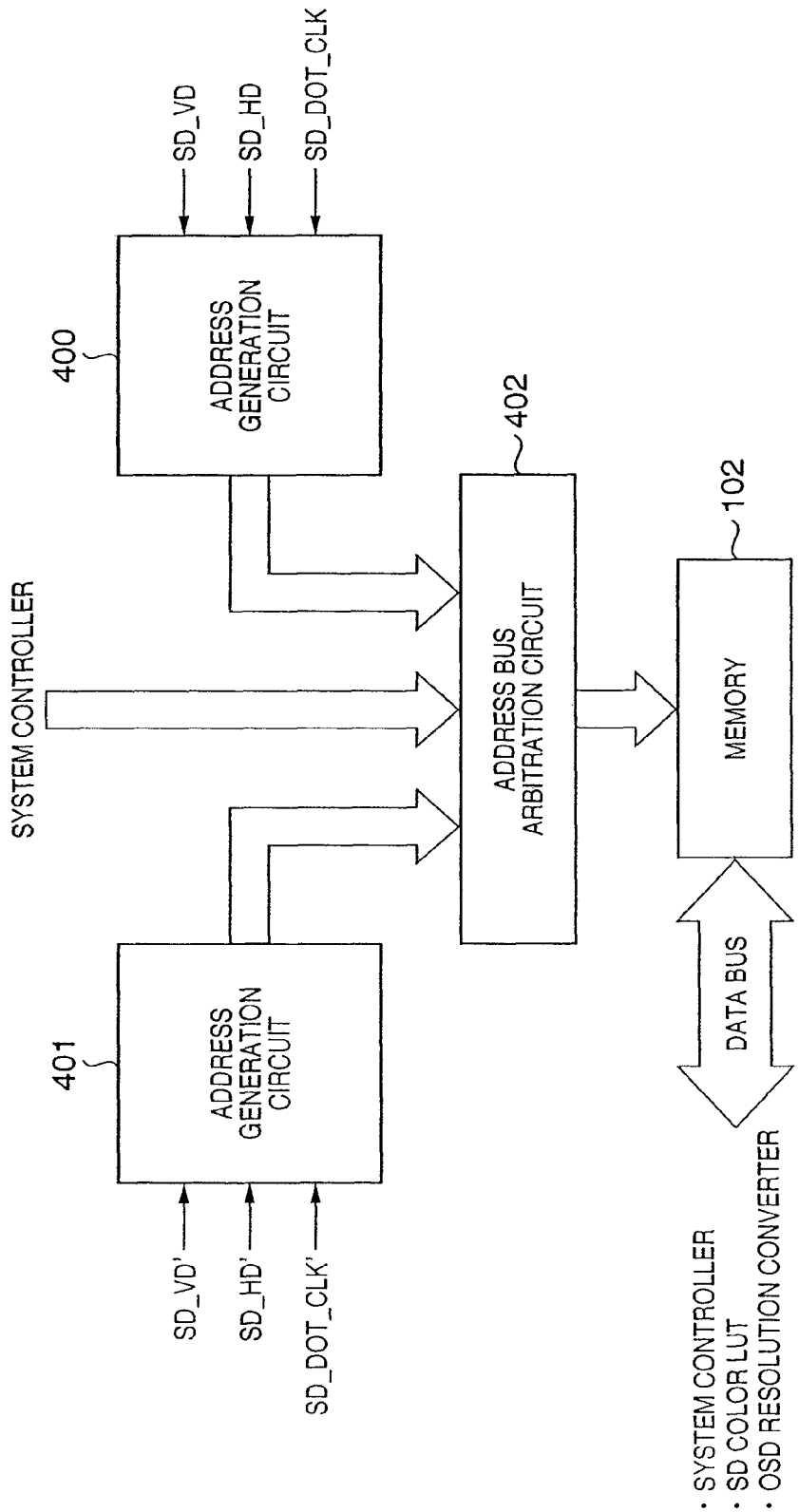
FIG. 2 is a block diagram showing a memory controller according to the embodiment.

FIG. 2 shows the block arrangement of the memory controller 101 and the relationship with the memory 102 according to the embodiment. The video apparatus according to the embodiment outputs a video signal of NTSC (720×480 pixels) as the SD format and a video signal of 1,920×1,080 pixels as the HD format.

In this case, the memory 102 according to the embodiment has a capacity of NH×NV pixels in the horizontal and vertical directions for 4 bits per pixel. NH and NV are smaller in size than the SD format, and when they are multiplied by an integer, the products do not exceed the size of the HD format. For example, NH=600 and NV=400.

The memory controller 101 is formed from address generation circuits 400 and 401, and an address bus arbitration circuit 402.

The address generation circuit 400 generates address signals in the raster scan order in order to read out OSD data from the memory 102 on the basis of sync signals SD_VD, SD_HD, and SD_DOT_CLK generated by the SD sync separation circuit 103.

The address generation circuit 401 generates similar address signals on the basis of the sync signals SD_VD', SD_HD', and SD_DOT_CLK' output from the frequency dividing circuit 133. Since the frequency dividing circuit 133 generates a sync signal of the SD format on the basis of a sync signal of the HD format from the HD sync separation unit 115, the address generation circuit 401 generates an OSD data read address to be output from the D terminal connector 121.

The address bus arbitration circuit 402 performs write/read of OSD bitmap data in/from the memory 102 by the system controller 127, and address arbitration between the two address generation circuits 400 and 401. Readout OSD data is data of a resolution corresponding to the SD format, and provides only a small display in the HD format. To prevent this, the OSD resolution converter 116 also multiplies OSD data to be output with the HD format by an integer (two times in the embodiment) in both the horizontal and vertical directions, and then outputs the OSD data.

Note that recent memories can access at several hundred M clocks, and a band enough to read OSD data is ensured for the address bus arbitration circuit 402 and memory 102. Hence, even while OSD data for OSD display are read out from the address generation circuits 400 and 401, the system controller 127 can write. OSD data to be displayed in the memory 102.

<Description of LUT>

As described above, OSD data of one pixel read out from the memory 102 is formed from 4 bits. The 4-bit data is decoded into 16-bit data by the SD color LUT 104 and HD color LUT 117, respectively, and video data and the OSD data are synthesized by the OSD_MIX units 105 and 118, respectively.

Figure 3:
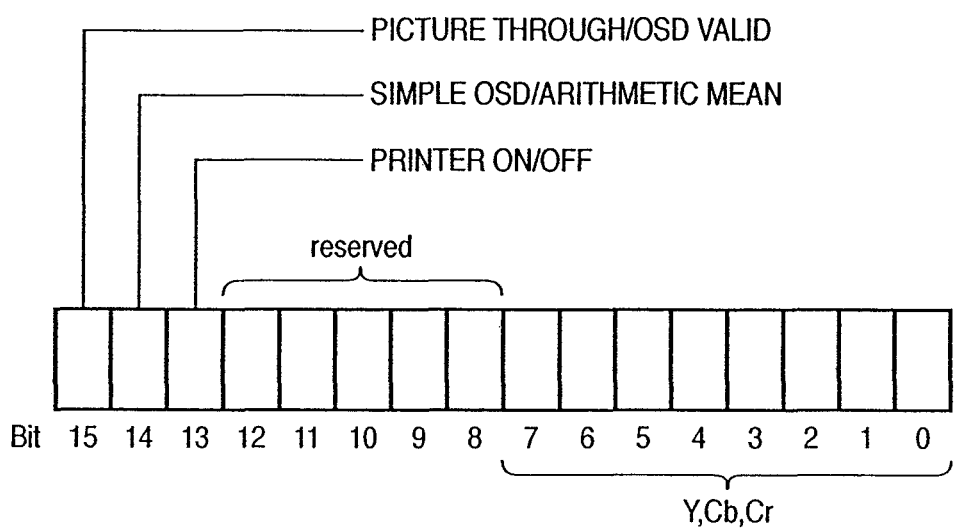
FIG. 3 is a view showing the contents of bit assignment of output data from an SD color LUT and HD color LUT according to the embodiment.

Each of 16 bits is assigned a meaning as shown in FIG. 3. The MSB (bit 15) represents which of a sensed picture or playback picture (to be simply referred to as sensed data hereinafter) and OSD data is passed. To pass sensed data, bit 14 and lower bits are insignificant. In other words, the following description applies only when at least OSD data is displayed.

Bit 14 represents which of a simple OSD or the arithmetic mean of video data and OSD data is displayed. If the simple OSD is set, a corresponding pixel displays only the OSD. For the arithmetic mean, the OSD and sensed picture are mixed by 50% each, and a sensed image is displayed through the OSD.

Bit 13 represents whether to or not to blink the display.

Bits 9 to 12 represent "reserved", and bits 0 to 7 store Y, Cb, and Cr data.

Figure 4:
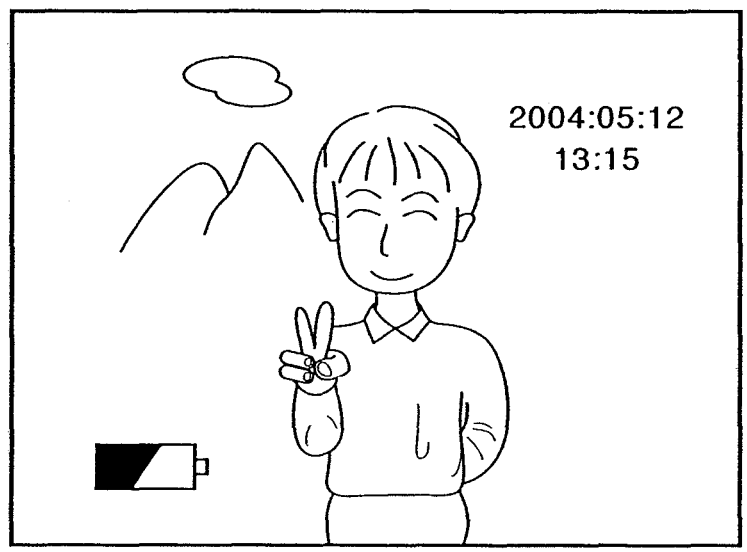
FIG. 4 is a view showing an example of synthesizing OSD data on a video signal.

To display an OSD of the photographing month, date, and time, and the remaining battery amount, as shown in FIG. 4, the system controller 127 writes in the memory 102 the character pattern of the photographing month, date, and time, and a symbol pattern representing the remaining battery amount. At this time, data as shown in FIG. 3 are written at addresses 0 to 15 of the SD color look-up table 104, and the display can be provided with a desired color and desired form.

Similarly, an OSD of the HD format can be displayed by writing the same data in the HD color LUT 117.

As is apparent from the above description, when the MSB in 16-bit data of all addresses 0 to 15 in the HD color LUT 117 is so set as to pass video data, an OSD is displayed on the liquid crystal display panel 108 and the like, but only video data can be displayed on an HD-compatible display device connected to the D terminal.

That is, color LUTs are respectively arranged for the SD and HD formats, and the corresponding OSD_MIX units 105 and 118 independently execute a process of displaying an OSD. The display color and display effect can be independently set while one OSD data is shared. Since video data to be finally displayed is synthesized with an OSD immediately before outputting the video data, degradation of the OSD quality can be prevented.

<Relationship with Display Frame>

The relationship between an HD display frame, an SD display frame, and display of multiplexed OSD data will be explained with reference to FIG. 5.

Figure 5:
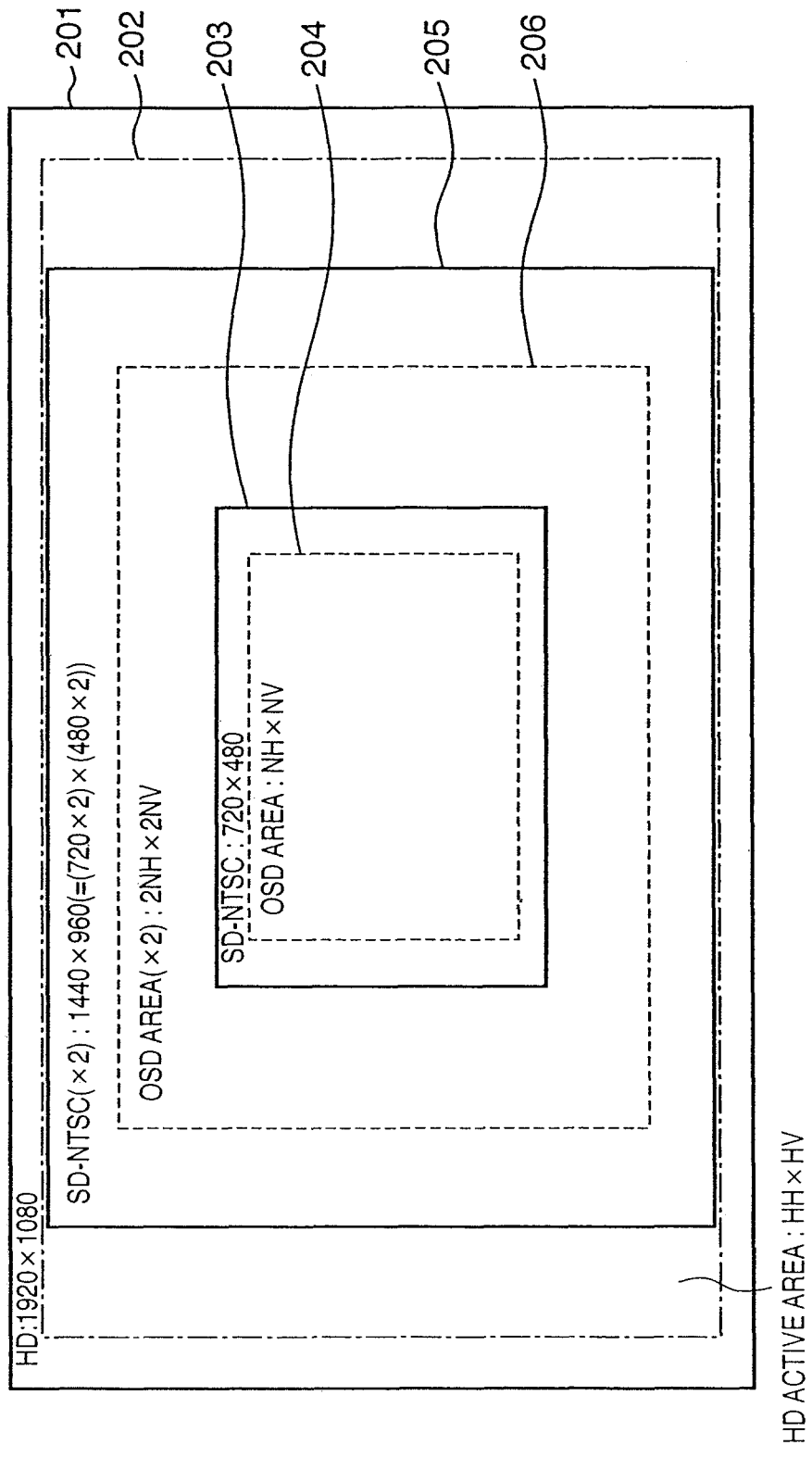
FIG. 5 is a view showing the relationship between an HD display frame, NTSC display frame, and OSD data area according to the embodiment.

In FIG. 5, reference numeral 201 denotes a full resolution of 1,920×1,080 (horizontal 1,920 pixels×vertical 1,080 lines/frame) in the HD effective display area. The display is an interlaced display, and the resolution is 1,920×540 per field (1,920×1,080 per frame).

Reference numeral 202 denotes an effective display area of an HD display-compatible display device. The resolution of the effective display area changes depending on the use of various television monitors. One criterion of the resolution is about 85% of the effective display area 201.

Reference numeral 203 denotes an SD-NTSC full resolution of 720×480 (horizontal 720 pixels×vertical 480 lines/frame) when an OSD is multiplexed while the SD resolution is kept unchanged. Since the display is an interlaced display, the field size is 720×240.

Reference numeral 204 denotes an OSD AREA image area prepared by defining within the SD-NTSC full resolution 203 an area for multiplexing an OSD so as to fully display an OSD. Assuming that the size of the OSD AREA image area is NH x NV (horizontal NH pixels×vertical NV lines/frame), NH and NV are integers, and NH≤720 and NV≤480.

Reference numeral 205 denotes an SD-NTSC (×2) resolution of 1,440×960 (horizontal 1,440 pixels×vertical 960 lines/frame) obtained by doubling the SD-NTSC full resolution 203 in both the horizontal and vertical directions.

Reference numeral 206 denotes an OSD AREA (x 2) resolution of 2NH×2NV (horizontal 2NH pixels×vertical 2NV lines/frame) obtained by doubling the OSD AREA image area 204 in both the horizontal and vertical directions.

In order to display common OSD data in both the SD display and HD display without any omission, the embodiment sets

2NH≤1,440, 2NV≤960

The above-mentioned resolution of 600×400 satisfies this condition.

An example of employing NTSC as the SD format has been described, and an application of the PAL format is shown in FIG. 6.

The PAL format is different in size from the NTSC format of FIG. 5. It should be noted that the display exceeds the HD full resolution area 201 when an SD-PAL full resolution area 303 is doubled in both the horizontal and vertical directions. Hence, PH and PV are determined so that an area 306 prepared by doubling an OSD area 304 falls within the range of an effective display area 302 of an HD display-compatible display device. These settings do not pose any problem in OSD-multiplexed display according to the embodiment. Also in this case, for example, PH=600 and PV=400 satisfy this condition.

The video apparatus of the embodiment independently converts the resolutions of a picture and OSD data to be multiplexed on the picture, and then multiplexes the picture and OSD data. The video apparatus can therefore multiplex and display, from common OSD data, OSD data whose display color can also be independently controlled within the effective display area, on a plurality of pictures which are generated from the same original picture but have different resolutions, without degrading the qualities of these pictures. That is, a conventional apparatus must prepare different OSD data to be multiplexed on pictures of different resolutions, whereas the video apparatus of the embodiment suffices to prepare only single OSD data, reducing the circuit scale in ASIC implementation. Also, degradation of the OSD display quality upon conversion of the resolution can be prevented by converting the OSD resolution by an integer multiple.

The embodiment has exemplified NTSC and HD, and PAL and HD, but the present invention can be applied to an apparatus having three, NTSC, PAL, and HD display functions. In the embodiment, a video signal of the SD format is common to the liquid crystal display panel, EVF, and line-out connector. However, the liquid crystal display panel and EVF are permanently provided to the apparatus, and thus need not have the same resolution as that of an output from the line-out connector. That is, the embodiment has exemplified two resolutions, but three or more resolutions may be adopted.

As has been described above, the present invention can reduce the circuit scale by synthesizing OSD data to be superposed on a picture of each resolution by using common OSD data. The present invention can prevent degradation of the quality upon conversion of the resolution by converting the resolution of OSD data by an integer multiple.

As many apparently widely different embodiments of the present invention can be made without departing from the spirit and scope thereof, it is to be understood that the invention is not limited to the specific embodiments thereof except as defined in the claims.

Claim of Priority

This application claims priority from Japanese Patent Application No. 2004-145487 filed May 14, 2004, which is hereby incorporated by reference herein.

What is claimed is:

1. A video apparatus which processes first video signals and second video signals, the apparatus comprising:
   a memory which stores OSD data;
   a read out unit which reads out the OSD data from said memory;
   a first look up table which sets a color to the OSD data read out by said read out unit;
   a first synthesis unit which synthesizes the OSD data having the color set by said first look up table with the first video signals;
   a second look up table, which is independent with respect to said first look up table, which sets a color to the OSD data read out by said read out unit; and
   a second synthesis unit which synthesizes the OSD data having the color set by said second look up table with the second video signals,
   wherein in a case where the apparatus independently outputs video signals synthesized by said first synthesis unit and video signals synthesized by said second synthesis unit, (a) said read out unit reads out first OSD data, and (b) independently said first look up table sets a color to the first OSD data, and said second look up table sets a color to the first OSD data, and
   wherein said first look up table and said second look up table set, to the first OSD data, colors different from each other.

2. The apparatus according to claim 1, wherein the OSD data having the color set by said second look up table is obtained by multiplying OSD data read out from said memory by M (M is an integer) in both horizontal and vertical directions.

3. The apparatus according to claim 2, wherein the OSD data having the color set by said second look up table is enlarged so as to set an area size of enlarged OSD data to be smaller than an area size of the second video signals.

4. The apparatus according to claim 1, further comprising:
   an output unit which outputs the signals synthesized by said first synthesis unit and the signals synthesized by said second synthesis unit via ports independent from each other.

5. The apparatus according to claim 1, wherein said first look up table also sets a transparency of the OSD data,
   wherein said first synthesis unit synthesizes the OSD data to which the transparency has been set by said first look up table with the first video signals,
   wherein said second look up table sets a transparency of the OSD data independently with respect to said first look up table, and
   wherein said second synthesis unit synthesizes the OSD data to which the transparency has been set by said second look up table with the second video signals.

6. The apparatus according to claim 1, wherein said first look up table and said second look up table can set whether or not blinking display of the OSD data is performed independently.

7. A video apparatus which processes first video signals and second video signals, the apparatus comprising:
   a memory which stores OSD data;
   a read out unit which reads out the OSD data from said memory;
   a first look up table which sets a transparency to the OSD data read out by said read out unit;

a first synthesis unit which synthesizes the OSD data to which the transparency has been set by said first look up table with the first video signals;

a second look up table which is independent with respect to said first look up table and which sets a transparency to the OSD data read out by said read out unit; and a second synthesis unit which synthesizes the OSD data to which the transparency has been set by said second look up table with the second video signals, wherein in a case where the apparatus independently outputs video signals synthesized by said first synthesis unit and video signals synthesized by said second synthesis unit, (a) said read out unit reads out first OSD data, and (b) independently said first look up table sets a transparency to the first OSD data, and said second look up table sets a transparency to the first OSD data, and wherein said first look up table and said second look up table set, to the first OSD data, transparencies different from each other.

8. The apparatus according to claim 7, wherein the OSD data having the color set by said second look up table is obtained by multiplying OSD data read out from said memory by M (M is an integer) in both horizontal and vertical directions.

9. The apparatus according to claim 8, wherein the OSD data having the color set by said second look up table is enlarged so as to set an area size of enlarged OSD data to be smaller than an area size of the second video signals.

10. The apparatus according to claim 7, further comprising:

an output unit which outputs the signals synthesized by said first synthesis unit and the signals synthesized by said second synthesis unit via ports independent from each other.

11. The apparatus according to claim 7, wherein said first look up table and said second look up table can set whether or not blinking display of the OSD data is performed independently.

12. A video apparatus, which processes first video signals and second video signals, the apparatus comprising:

a memory which stores OSD data;

a read out unit which reads out the OSD data from said memory;

a first setting unit which sets a display form of the OSD data read out by said read out unit;

a first synthesis unit which synthesizes the OSD data having the display form set by said first setting unit with the first video signals;

a second setting unit, which is independent with respect to said first setting unit, which sets a display form of the OSD data read out by said read out unit; and a second synthesis unit which synthesizes the OSD data having the display form set by said second setting unit with the second video signals, wherein in a case where the apparatus independently outputs video signals synthesized by said first synthesis unit and video signals synthesized by said second synthesis unit, (a) said read out unit reads out first OSD data, and (b) independently said first look up table sets a color to the first OSD data, and said second look up table sets a color to the first OSD data, and wherein said first look up table and said second look up table set, to the first OSD data, colors different from each other.

13. The apparatus according to claim 12, wherein the display form of the OSD data set by said first setting unit is related to a color of the OSD data or a transparency of the OSD data, and wherein the display form of the OSD data set by said second setting unit is related to a color of the OSD data or a transparency of the OSD data.

14. The apparatus according to claim 12, wherein said first setting unit and said second setting unit can set whether or not blinking display of the OSD data is performed independently.

15. The apparatus according to claim 12, further comprising:

an output unit which outputs the signals synthesized by said first synthesis unit and the signals synthesized by said second synthesis unit via ports independent from each other.

* * * * *